(12) United States Patent
Iwaki et al.

(10) Patent No.: US 10,120,614 B2
(45) Date of Patent: Nov. 6, 2018

(54) STORAGE DEVICE, STORAGE SYSTEM, AND METHOD OF CONTROLLING STORAGE DEVICE

(71) Applicant: SONY CORPORATION, Tokyo (JP)

(72) Inventors: Hiroyuki Iwaki, Kanagawa (JP); Ken Ishii, Tokyo (JP); Ryoji Ikegaya, Kanagawa (JP); Kenichi Nakanishi, Tokyo (JP); Yasushi Fujinami, Tokyo (JP); Naohiro Adachi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/311,555

(22) PCT Filed: May 19, 2015

(86) PCT No.: PCT/JP2015/064320
§ 371 (c)(1),
(2) Date: Nov. 16, 2016

(87) PCT Pub. No.: WO2015/182439
PCT Pub. Date: Dec. 3, 2015

(65) Prior Publication Data
US 2017/0109099 A1    Apr. 20, 2017

(30) Foreign Application Priority Data
May 26, 2014 (JP) ................. 2014-107997

(51) Int. Cl.
*G06F 3/06* (2006.01)
*G06F 11/14* (2006.01)
*G06F 11/16* (2006.01)
*G06F 11/20* (2006.01)

(52) U.S. Cl.
CPC .......... *G06F 3/0659* (2013.01); *G06F 3/0604* (2013.01); *G06F 3/0679* (2013.01); *G06F 11/141* (2013.01); *G06F 11/1666* (2013.01); *G06F 11/20* (2013.01)

(58) Field of Classification Search
CPC ..... G06F 3/0679; G06F 3/0659; G06F 3/0604
USPC ....................................... 711/103
See application file for complete search history.

(56) References Cited

U.S. PATENT DOCUMENTS

2010/0125698 A1 * 5/2010 Fujimoto ............ G06F 3/0613
711/103

FOREIGN PATENT DOCUMENTS

| JP | 06-131895 A | 5/1994 |
| JP | 06-332806 A | 12/1994 |
| JP | 2003-076615 A | 3/2003 |
| JP | 2007-317078 A | 12/2007 |

* cited by examiner

*Primary Examiner* — Jasmine Song
(74) *Attorney, Agent, or Firm* — Chip Law Group

(57) ABSTRACT

A storage device writes data at a high speed. The storage device is provided with a data area and a control unit. In the data area, a write position is specified by a write address. Also, the control unit writes the data in the write address when instructed to write the data in the write address, and generates an address different from the write address in which the writing is performed as an alternative write address and writes the data in the alternative write address when the writing of the data is unsuccessful.

9 Claims, 18 Drawing Sheets

FIG. 13
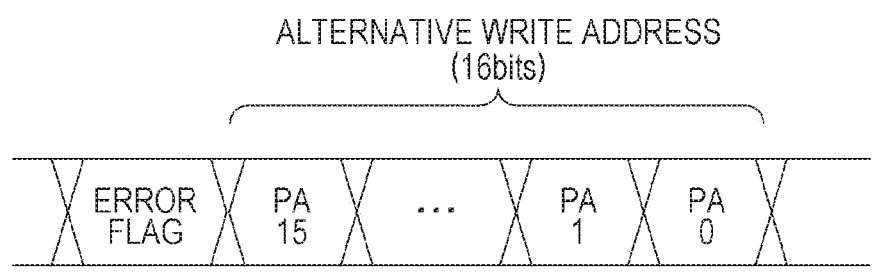
a
b

STORAGE DEVICE, STORAGE SYSTEM, AND METHOD OF CONTROLLING STORAGE DEVICE

CROSS REFERENCE TO RELATED APPLICATIONS

This application is a U.S. National Phase of International Patent Application No. PCT/JP2015/064320 filed on May 19, 2015, which claims priority benefit of Japanese Patent Application No. JP 2014-107997 filed in the Japan Patent Office on May 26, 2014. Each of the above-referenced applications is hereby incorporated herein by reference in its entirety.

TECHNICAL FIELD

The present technology relates to a storage device, a storage system, and a method of controlling the storage device. In detail, this relates to the storage device which writes data, the storage system, and the method of controlling the storage device.

BACKGROUND ART

Conventionally, verification is performed for determining whether writing is successful after the writing of write data in a storage device such as a memory. Herein, the verification is processing in which the storage device holds the write data, data is read from a write address after the write data is written in the write address, and the storage device verifies the read data against the held write data. When the data are not identical to each other, a memory controller is notified of a write error.

Then, when the write error occurs, predetermined exception processing is performed. For example, a memory system in which the memory controller which receives the write error after transmitting a write command retransmits the write command specifying a new write address to require a memory to rewrite the data is suggested (for example, refer to Patent Document 1).

CITATION LIST

Patent Document

Patent Document 1: Japanese Patent Application Laid-Open No. 2003-76615

SUMMARY OF THE INVENTION

Problems to be Solved by the Invention

However, it is difficult to write the data at a high speed in the above-described conventional technology. In the above-described system, when the memory fails in writing in a first write address, this is required to transmit the write error to the memory controller. Also, when the memory controller is notified of the write error after transmitting the write command, this should retransmit the write command specifying the new write address to the memory. Therefore, in addition to the rewiring of the data, extra delay time required for transferring and processing each of the write error and the write command is generated and time until the writing is completed problematically becomes longer.

The present technology is achieved in view of such a situation and an object thereof is that the storage device writes the data at a high speed.

Solutions to Problems

The present technology is achieved for solving the above-described problem and a first aspect thereof is a storage device provided with a data area in which a write position is specified by a write address, and a control unit which writes data in the write position when the write position is specified by the write address and generates a write address different from the specified write address as an alternative write address to write the data in a write position specified by the alternative write address when writing of the data is unsuccessful, and a method of controlling the same. According to this, there is an effect that the alternative write address is generated and the data is written in the write position specified by the alternative write address when the writing of the data is unsuccessful.

Also, in the first aspect, the data area may include a general data area in which the write position is specified by a general write address being the write address specified by a write command and an alternative data area in which the write position is specified by the alternative write address corresponding to the general write address, and the control unit may generate the alternative write address corresponding to the general write address when the writing of the data is unsuccessful. According to this, there is an effect that the alternative write address corresponding to the general write address is generated when the writing of the data is unsuccessful.

Also, in the first aspect, a holding unit which holds a use flag indicating whether the data is written in the alternative write address for each alternative write address is further provided, and the control unit may generate the alternative write address relating to the use flag indicating that the writing is not performed when the writing of the data is unsuccessful. According to this, there is an effect that the alternative write address relating to the use flag indicating that the writing is not performed is generated when the writing of the data is unsuccessful.

Also, a second aspect of the present technology is a storage system provided with a control device which specifies a write position of data by a write address, a data area in which the write position is specified by the write address, and a control unit which writes the data in the write position when the write position is specified by the write address and generates a write address different from the specified write address as an alternative write address to write the data in a write position specified by the alternative write address when writing of the data is unsuccessful. According to this, there is an effect that the alternative write address is generated and the data is written in the write position specified by the alternative write address when the writing of the data is unsuccessful.

Also, in the second aspect, the control device may include an address conversion table which associates a logical address and a physical address with each other to hold, and an access control unit which obtains the physical address corresponding to the logical address as the write address to specify the write position by the write address, and associates the alternative write address with the logical address when the writing of the data in the write position specified by the alternative write address is successful. According to this, there is an effect that the alternative write address is associated with the logical address when the writing of the data in the alternative write address is successful.

Also, in the second aspect, the data area includes a general data area in which the write position is specified by a general write address being the write address specified by a write command, and an alternative data area in which the write position is specified by the alternative write address corresponding to the general write address, and the control unit may generate the alternative write address corresponding to the general write address in which the writing is performed when the writing of the data is unsuccessful. According to this, there is an effect that the alternative write address corresponding to the general write address in which the writing is performed is generated when the writing of the data is unsuccessful.

Also, in the second aspect, the control unit may supply an error flag and a write destination flag to the access control unit, the error flag indicating whether the writing of the data is successful, the write destination flag indicating which of the general write address and the alternative write address is specified when the data is written, and the access control unit may generate the alternative write address corresponding to the general write address to associate with the logical address when being supplied with the error flag indicating that the writing of the data is successful and the write destination flag indicating that the data is written with the alternative write address specified. According to this, there is an effect that the alternative write address corresponding to the general write address is generated when the error flag indicating that the writing of the data is successful and the write destination flag indicating that the data is written in the alternative write address are supplied.

Also, in the second aspect, the control unit may supply an error flag indicating whether the writing of the data is successful and the generated alternative write address to the access control unit, and the access control unit may associate the supplied alternative write address with the logical address when being supplied with the error flag indicating that the writing of the data is successful and the alternative write address. According to this, there is an effect that the supplied alternative write address is associated with the logical address when the error flag indicating that the writing of the data is successful and the alternative write address are supplied.

Effects of the Invention

The present technology may have an excellent effect that the storage device may write the data at a high speed. Meanwhile, the effect is not necessarily limited to that herein described and may be any effect described in this disclosure.

BRIEF DESCRIPTION OF DRAWINGS

FIG. 13 is a view illustrating an example of a status in a variation of the first embodiment.

MODE FOR CARRYING OUT THE INVENTION

A mode for carrying out the present technology (hereinafter, referred to as an embodiment) is hereinafter described. The description will be given in the following order.

1. First Embodiment (Example of Generating Corresponding Alternative Write Address and Writing Data)

2. Second Embodiment (Example of Generating Any Unused Alternative Write Address and Writing Data)

1. First Embodiment

[Configuration Example of Memory System]

Figure 1:
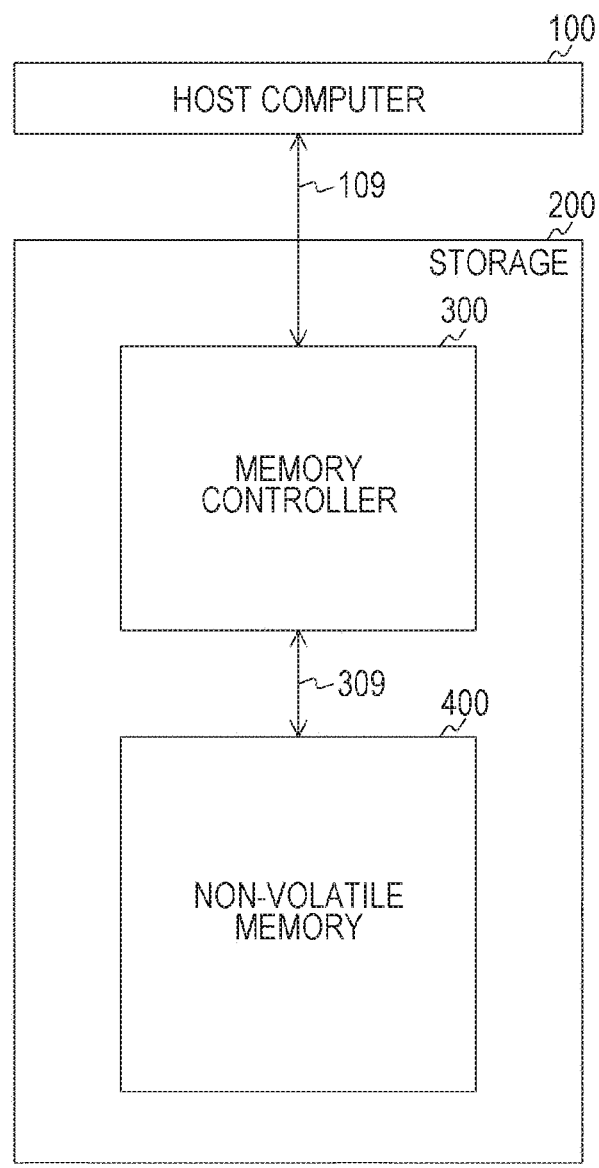
FIG. 1 is an overall view illustrating a configuration example of a memory system in a first embodiment.

FIG. 1 is an overall view illustrating a configuration example of a memory system in a first embodiment. The memory system is provided with a host computer 100 and a storage 200. The storage 200 is provided with a memory controller 300 and a non-volatile memory 400. Meanwhile, the memory system is an example of a storage system recited in claims.

The host computer 100 controls an entire memory system. Specifically, the host computer 100 instructs the memory controller 300 to write write data and read read data while specifying a logical address as an access destination.

Herein, the logical address is the address assigned for each access unit when the host computer 100 accesses the storage 200 in an address space defined by the host computer 100 and the memory controller 300.

The memory controller 300 controls the non-volatile memory 400. When the memory controller 300 is instructed by the host computer 100 to write the write data, this converts the specified logical address to a physical address. Then, the memory controller 300 issues a write command specifying the converted physical address as the access destination and supplies the same to the non-volatile memory 400 together with the write data through a signal line 309.

Herein, the physical address is the address assigned in the non-volatile memory 400 for each access unit when the memory controller 300 accesses the non-volatile memory 400. Capacity of the non-volatile memory 400 is desirably larger than capacity of the address space of the logical address. This is for securing the physical address to be alternatively assigned to the logical address when writing in the physical address is unsuccessful.

Also, when the memory controller 300 is instructed by the host computer 100 to read the read data, this converts the specified logical address to the physical address. Then, the memory controller 300 issues a read command specifying the converted physical address as the access destination and supplies the same to the non-volatile memory 400 through the signal line 309. The memory controller 300 receives the read data from the non-volatile memory 400 and transfers the same to the host computer 100.

The memory controller 300 also receives a status from the non-volatile memory 400. Herein, the status is information for notifying an execution result of a command and a status of the memory controller 300 and the like.

Meanwhile, the memory controller 300 is an example of a control device recited in claims.

The non-volatile memory 400 stores the data under the control of the memory controller 300. When the non-volatile memory 400 receives the write command and the write data from the memory controller 300, this writes the write data in the physical address specified by the write command. Also, when the non-volatile memory 400 receives the read command from the memory controller 300, this reads the data from the physical address specified by the read command and supplies the same to the memory controller 300. Also, the non-volatile memory 400 generates the status and supplies the same to the memory controller 300.

Meanwhile, although it is configured such that the non-volatile memory 400 stores the data, a storage device other than the non-volatile memory 400 such as a hard disk drive (HDD) may also store the data. Also, the non-volatile memory 400 is an example of a storage device recited in claims.

[Configuration Example of Memory Controller]

Figure 2:
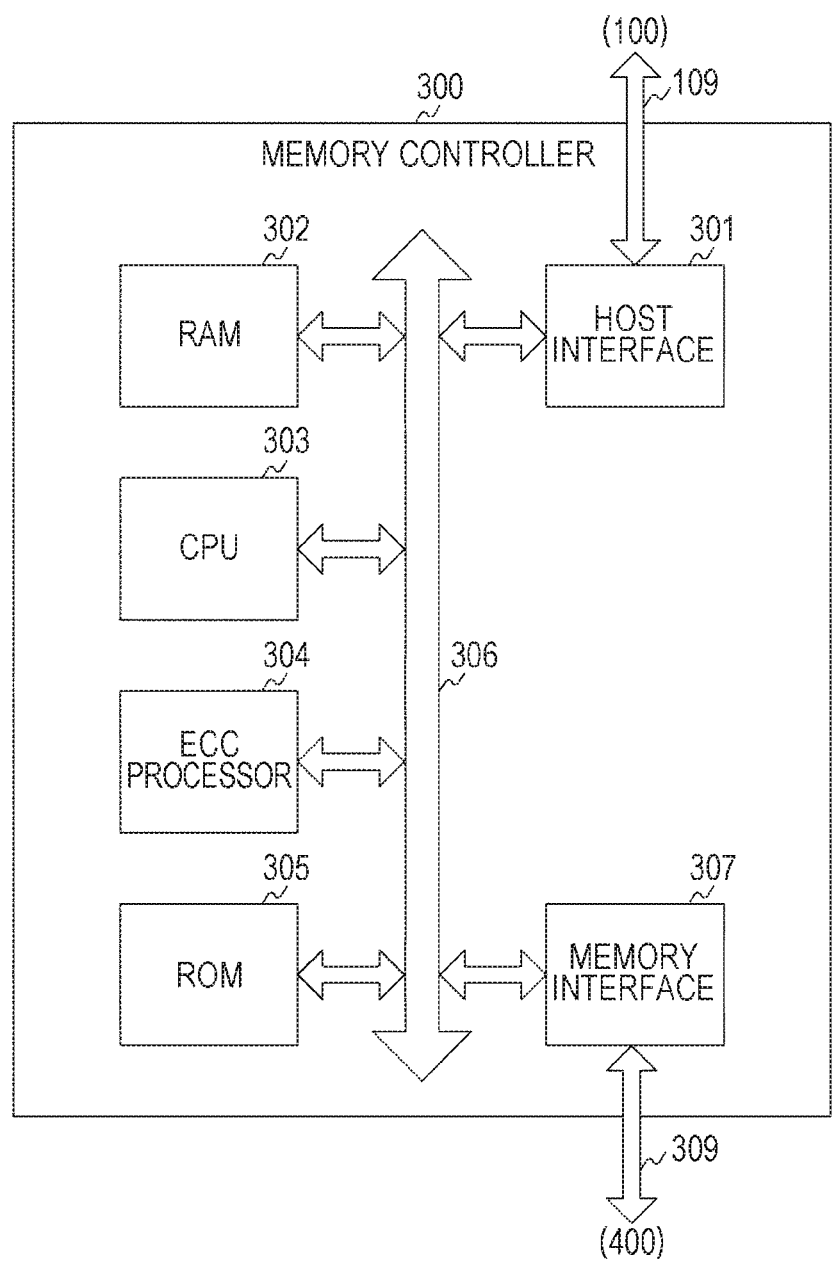
FIG. 2 is a block diagram illustrating a configuration example of a memory controller in the first embodiment.

FIG. 2 is a block diagram illustrating a configuration example of the memory controller 300 in the first embodiment. The memory controller 300 is provided with a host interface 301, a random access memory (RAM) 302, and a central processing unit (CPU) 303. The memory controller 300 is also provided with an ECC processor 304, a read only memory (ROM) 305, a bus 306, and a memory interface 307.

The host interface 301 is the interface for the memory controller 300 and the host computer 100 to exchange the data and the command with each other. The RAM 302 temporarily holds the data required in processing executed by the CPU 303. The CPU 303 controls an entire memory controller 300.

The ECC processor 304 codes the data into an error detection and correction code (ECC) and detects/corrects an error in the data on the basis of the ECC. In the ECC processor 304, a Bose-Chaudhuri-Hocquenghem (BCH) code and a Reed-Solomon (RS) code are used as the ECC, for example. Also, when the ECC processor 304 fails in detecting/correcting the error, this describes a read error in the status and supplies the same to the host computer 100.

The ROM 305 stores a program and the like executed by the CPU 303. The bus 306 is a common path for the host interface 301, the RAM 302, the CPU 303, the ECC processor 304, the ROM 305, and the memory interface 307 to exchange the data with one another. The memory interface 307 is the interface for the memory controller 300 and the non-volatile memory 400 to exchange the data and the command with each other.

[Configuration Example of Memory Controller]

Figure 3:
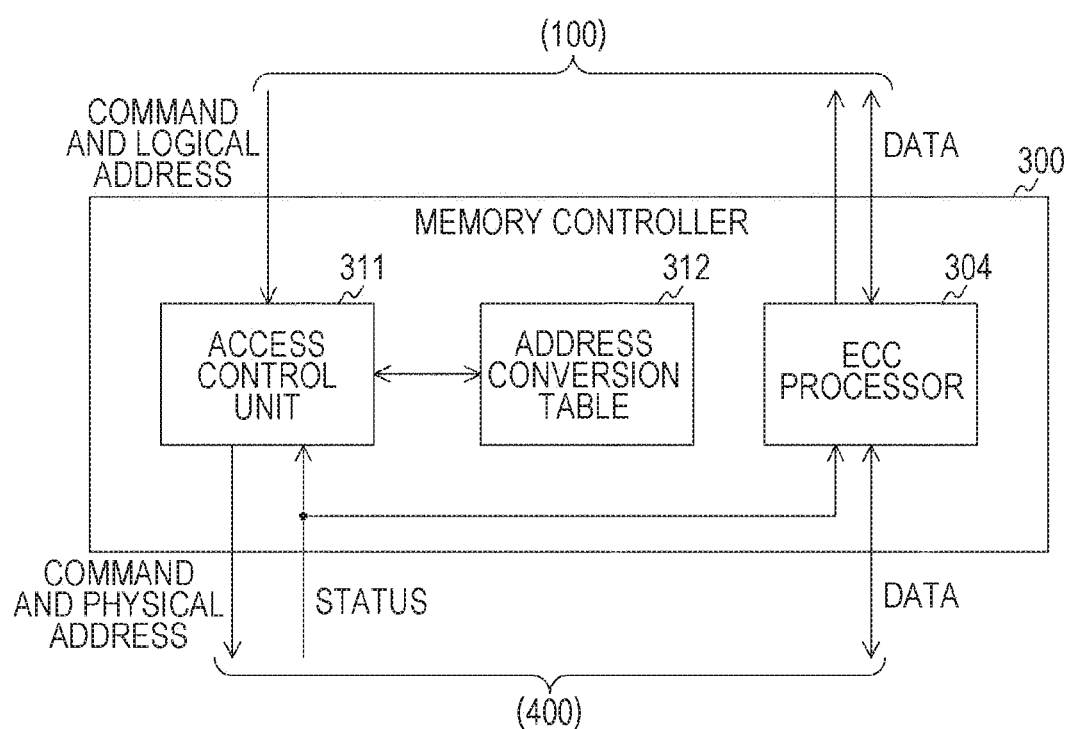
FIG. 3 is a block diagram illustrating a functional configuration example of the memory controller in the first embodiment.

FIG. 3 is a block diagram illustrating a functional configuration example of the memory controller 300 in the first embodiment. The memory controller 300 is provided with an access control unit 311, an address conversion table 312, and the ECC processor 304.

A function of the access control unit 311 in FIG. 3 is realized by the host interface 301, the RAM 302, the CPU 303, the ROM 305, the memory interface 307 and the like in FIG. 2. Also, the address conversion table 312 in FIG. 3 is held in the RAM 302 in FIG. 2, for example.

The access control unit 311 performs write processing/read processing to instruct the non-volatile memory 400 to write/read the data. When the access control unit 311 is instructed by the host computer 100 to write the write data, this converts the specified logical address to the physical address on the basis of the address conversion table 312. Then, the access control unit 311 issues the write command specifying the converted physical address as a general write address and supplies the same to the non-volatile memory 400.

Also, when the status notifying that the data is written in an alternative write address different from the general write address is supplied by the non-volatile memory 400, the access control unit 311 updates the address conversion table 312 on the basis of the status. An updated content is described later in detail.

Also, when the access control unit 311 is instructed by the host computer 100 to read the read data, this converts the specified logical address to the physical address on the basis of the address conversion table 312. Then, the access control unit 311 issues the read command specifying the converted physical address as a read address and supplies the same to the non-volatile memory 400.

The address conversion table 312 is the table in which the logical address and the physical address are associated with each other. In the address conversion table 312, presence or absence of the physical address associated with the logical address is recorded for each logical address, for example. Also, a status of use is recorded for each physical address in the address conversion table 312. Information indicating whether the physical address is associated with the logical address and the like is recorded as the status of use of the physical address.

[Configuration Example of Address Conversion Table]

Figure 4:
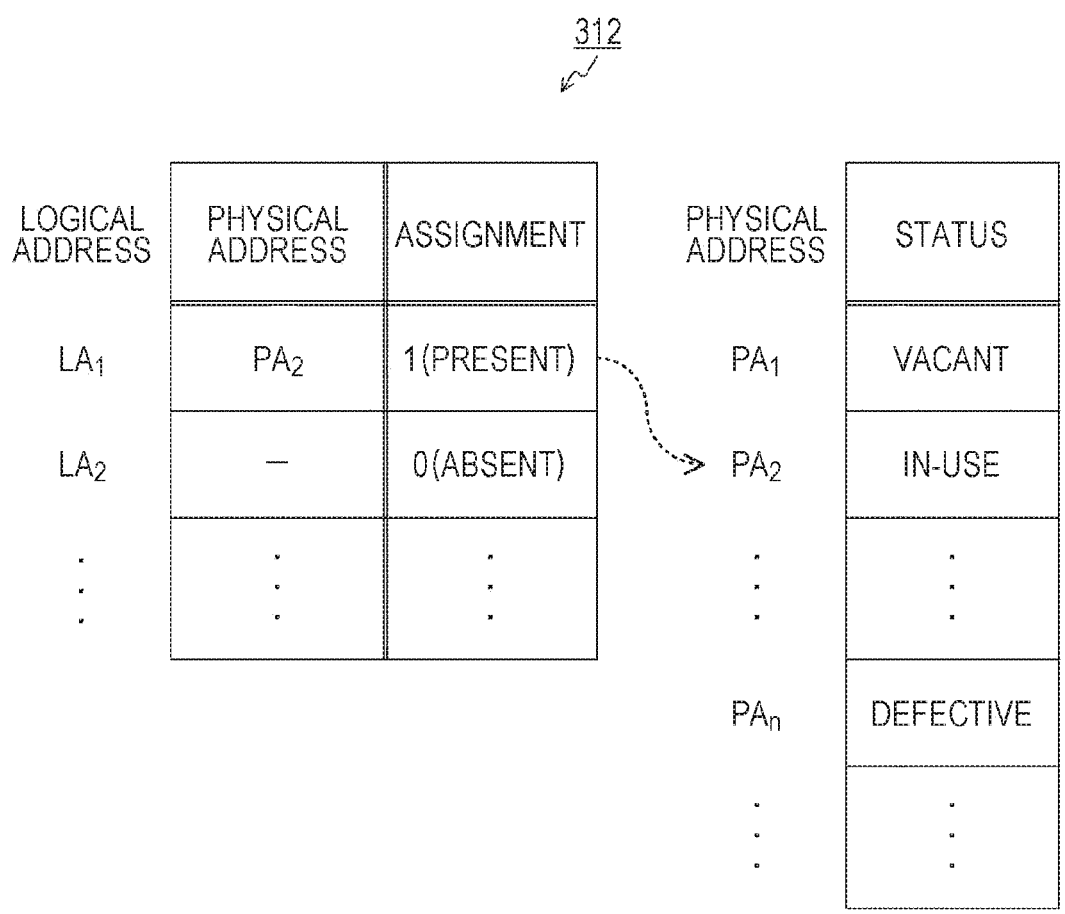
FIG. 4 is a view illustrating an example of an address conversion table in the first embodiment.

FIG. 4 is a view illustrating an example of the address conversion table 312 in the first embodiment. In the address conversion table 312, the physical address and information indicating presence or absence of assignment are held for each logical address, for example. The presence or absence of the assignment indicates whether the physical address is assigned to the logical address. In an initial state, there is no assignment. When the physical address is not assigned to the logical address specified by the host computer 100 as a data write destination, the physical address is newly assigned to the logical address.

Herein, the memory controller 300 performs wear-leveling as needed when selecting the physical address to be newly assigned. The wear-leveling is processing for equalizing consumption of a memory cell lifetime in the non-volatile memory 400. When performing the wear-leveling, the memory controller 300 records access frequency of each address and preferentially selects the address with low access frequency, for example.

Also, in the address conversion table 312, information indicating a status of the physical address is held for each physical address. The status indicating the status of use of the physical address and the like indicates any of "in-use", "vacant", and "defective", for example. "In-use" indicates that the data is written in the physical address of this status. "Vacant" indicates that the data is not written in the physical address of this status. "Defective" indicates that the physical address of this status is the address in which the data cannot be written due to a cause such as an end of a lifetime.

Also, when the memory controller 300 is notified by the non-volatile memory 400 that the data is successfully written in the alternative write address, this updates the status of the general write address specified as the write destination to "defective". The memory controller 300 also generates the alternative write address and associates the alternative write address in place of the general write address with the logical address specified as the write destination.

On the other hand, when the memory controller 300 is notified by the non-volatile memory 400 that the writing of the data is unsuccessful, this generates the alternative write address and updates the status of the general write address and the alternative write address specified as the write destination to "defective".

[Configuration Example of Non-Volatile Memory]

Figure 5:
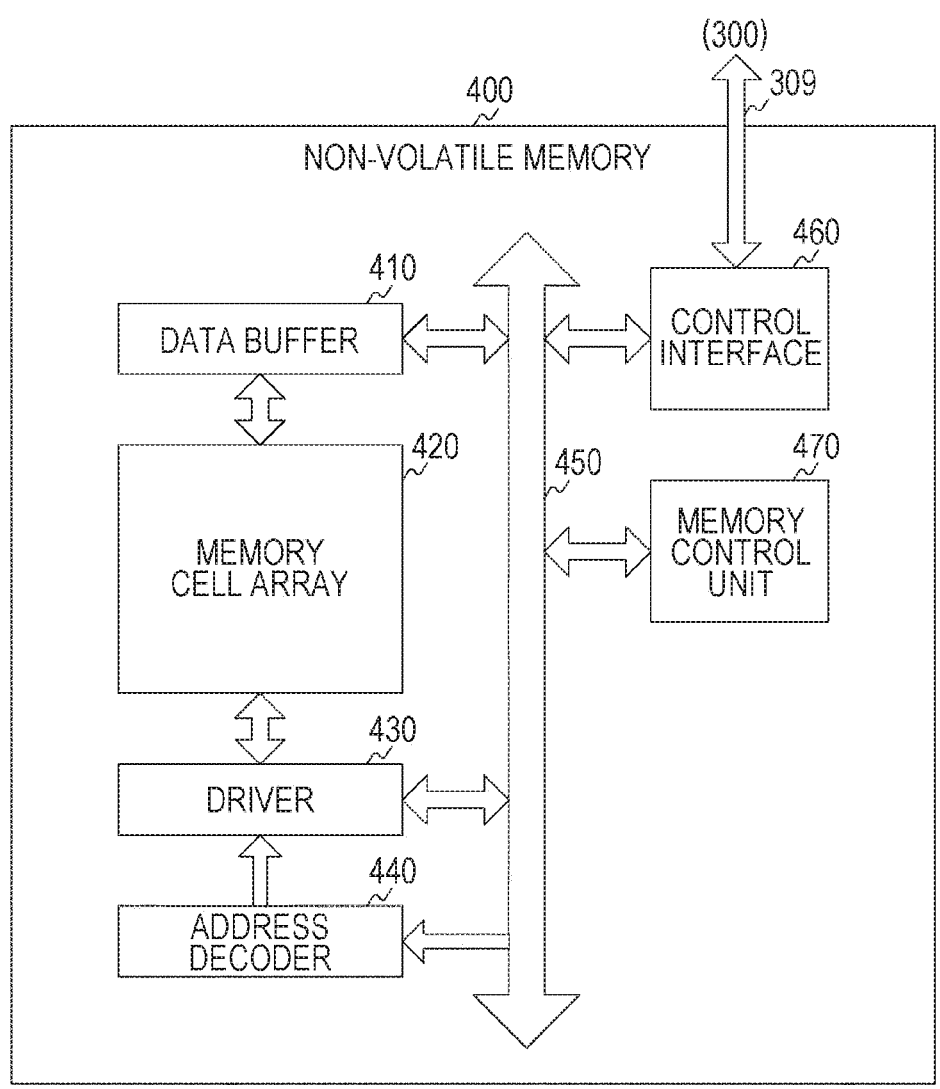
FIG. 5 is a block diagram illustrating a configuration example of a non-volatile memory in the first embodiment.

FIG. 5 is a block diagram illustrating a configuration example of the non-volatile memory 400 in the first embodiment. The non-volatile memory 400 is provided with a data buffer 410, a memory cell array 420, a driver 430, an address decoder 440, a bus 450, a control interface 460, and a memory control unit 470.

The data buffer 410 holds the write data and the read data in an access unit under the control of the memory control unit 470. The memory cell array 420 is provided with a plurality of memory cells arranged in a matrix pattern. A non-volatile storage element is used as each memory cell. Specifically, a NAND/NOR flash memory, a resistive RAM (ReRAM), a phase-change RAM (PCRAM), or a magnetoresistive RAM (MRAM) is used as the storage element.

The driver 430 writes the data in or reads the data from the memory cell selected by the address decoder 440. The address decoder 440 analyzes the address specified by the command to select the memory cell corresponding to the address. The bus 450 is a common path for the data buffer 410, the memory cell array 420, the address decoder 440, the memory control unit 470, and the control interface 460 to exchange the data with one another. The control interface 460 is the interface for the memory controller 300 and the non-volatile memory 400 to exchange the data and command with each other.

The memory control unit 470 controls the driver 430 and the address decoder 440 to write or read the data. When the memory control unit 470 receives the write command specifying the general write address, this allows the data buffer 410 to hold the write data. Also, the memory control unit 470 supplies the general write address specified by the write command to the address decoder 440. When the memory cell is selected by the address decoder 440, the memory control unit 470 controls the driver 430 to write the data in the memory cell.

Then, the memory control unit 470 controls the driver 430 to read the data from the memory cell in which the data is written. The memory control unit 470 verifies the read data against the write data held in the data buffer 410. When the verified data are identical to each other, the memory control unit 470 generates the status notifying that the writing in the general write address is successful and supplies the same to the memory controller 300 through the control interface 460.

On the other hand, when they are not identical to each other, the memory control unit 470 determines that the writing of the data is unsuccessful and generates the alternative write address. Then, the memory control unit 470 controls the driver 430 and the address decoder 440 to rewrite the write data in the generated alternative write address. Then, the memory control unit 470 controls the driver 430 to read the data from the memory cell corresponding to the alternative write address and verifies again. The memory control unit 470 generates the status on the basis of a result of the verification and supplies the same to the memory controller 300 through the control interface 460.

Also, when the memory control unit 470 receives the read command, this controls the address decoder 440 and the driver 430 to output the read data to the memory controller 300.

Meanwhile, the memory control unit 470 is an example of a control unit recited in claims.

As described above, when the non-volatile memory 400 fails in writing in the general write address, this generates the alternative write address and writes in the alternative write address without notifying a write error. According to this, the non-volatile memory 400 is not required to transmit the status notifying that the writing in the general write address is unsuccessful. Also, the memory controller 300 is not required to issue the write command specifying the alternative write address after issuing the write command specifying the general write address. Therefore, data writing time may be shortened by time required for transmitting/receiving and processing the status and the write command.

[Configuration Example of Memory Cell Array]

Figure 6:
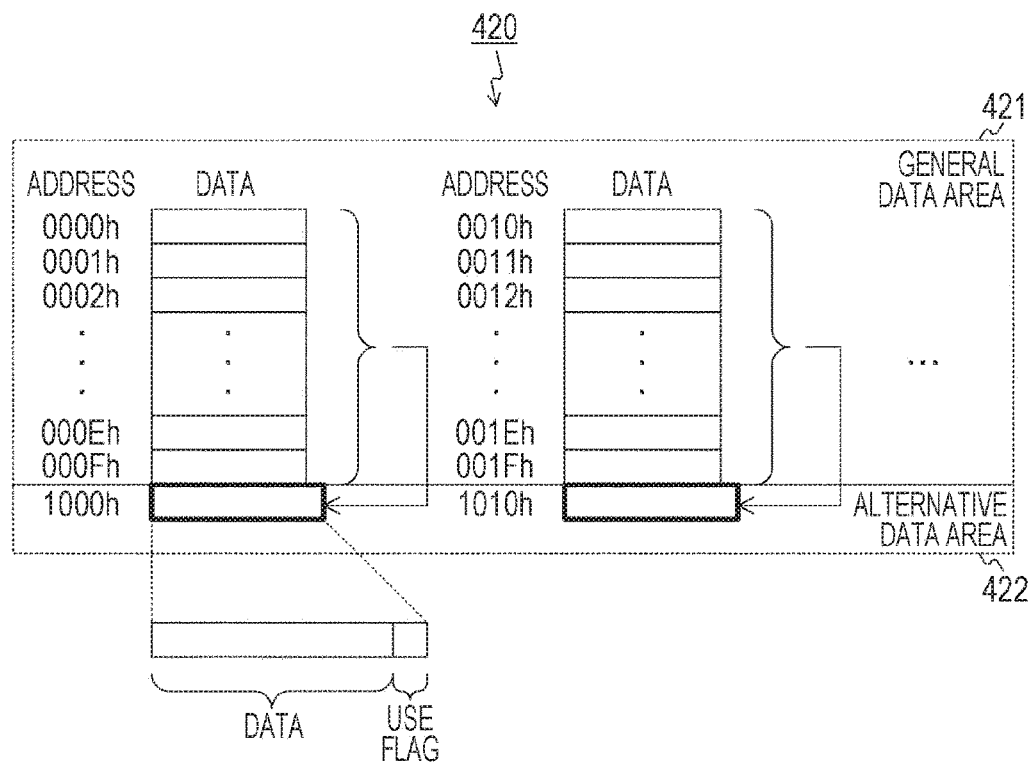
FIG. 6 is a view illustrating a configuration example of a memory cell array in the first embodiment.

FIG. 6 is a view illustrating a configuration example of the memory cell array 420 in the first embodiment. A general data area 421 and an alternative data area 422 are provided in the memory cell array 420.

The general data area 421 is the data area in which a write position is specified by the general write address. A plurality of memory cells to each of which the address is assigned is provided in the general data area 421 and the data is stored in the memory cell in the write position specified by the general write address. Also, the alternative data area 422 is the data area in which the write position is specified by the alternative write address corresponding to the general write address. In the alternative data area 422, a plurality of memory cells to each of which the address is assigned is provided and the data is stored in the memory cell in the write position specified by the alternative write address corresponding to the general write address. Also, in the alternative data area 422, a use flag is stored for each alternative write address. Herein, the use flag is the flag indicating whether the data is written in the alternative write address.

Meanwhile, the area formed of the general data area 421 and the alternative data area 422 is an example of a data area recited in claims.

An arrow in FIG. 6 indicates a correspondence relationship between the general write address and the alternative write address. For example, an alternative write address "1000" in hexadecimal notation is associated with general write addresses "0000" to "000F" in hexadecimal notation.

Hereinafter, the address is displayed in hexadecimal notation unless especially noted otherwise.

When the non-volatile memory 400 fails in writing the data in the general write address, this generates the alternative write address corresponding to the general write address by a predetermined operation. For example, the operation to make a highest-order digit and a lowest-order digit of the general write address displayed in hexadecimal notation "1" and "0", respectively, is performed. By the operation, "1000" is generated as the alternative address corresponding to the general write address "0005" and "1010" is generated as the alternative write address corresponding to the general write address "0012", for example.

Figure 7:
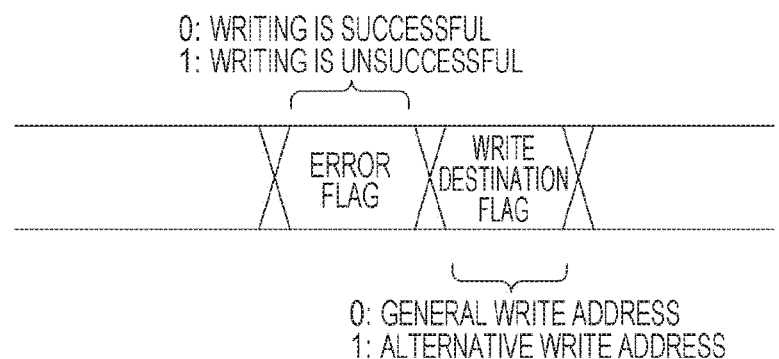
FIG. 7 is a view illustrating an example of a status generated by the non-volatile memory in the first embodiment.

FIG. 7 is a view illustrating an example of the status generated by the non-volatile memory 400 in the first embodiment. The non-volatile memory 400 generates the status including an error flag and a write destination flag and supplies the same to the memory controller 300.

The error flag is information indicating whether the writing of the data is successful. A value of the error flag is set to "0" when the writing is successful and is set to "1" when the writing is unsuccessful, for example. Also, the write destination flag is information indicating which of the general write address and the alternative write address is specified when the data is written. A value of the write destination flag is set to "0" when the writing of the data is successful with the general write address specified and is set to "1" regardless of whether it is successful when the data is written with the alternative write address specified, for example.

[Configuration Example of Memory Control Unit]

Figure 8:
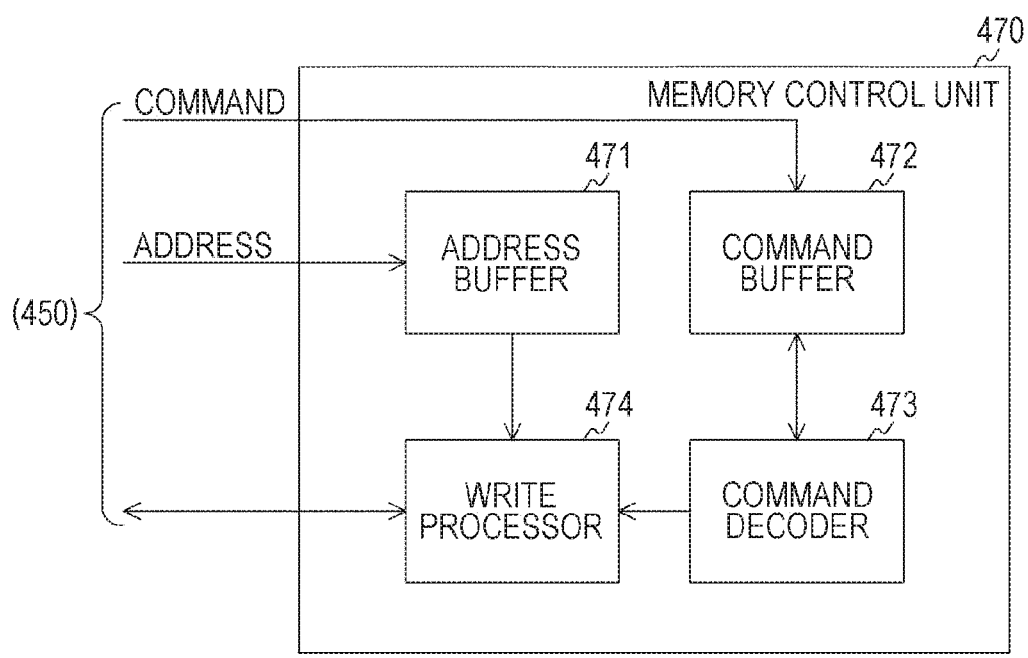
FIG. 8 is a block diagram illustrating a configuration example of a memory control unit in the first embodiment.

FIG. 8 is a block diagram illustrating a configuration example of the memory control unit 470 in the first embodiment. The memory control unit 470 is provided with an address buffer 471, a command buffer 472, a command decoder 473, and a write processor 474. Meanwhile, in the drawing, a configuration in which the memory control unit 470 performs the read processing is omitted.

The address buffer 471 holds the address specified by the command. The general write address and the alternative write address are held in the address buffer 471. The command buffer 472 holds the command from the memory controller 300.

The command decoder 473 decodes the command from the memory controller 300 to generate a control signal to control the driver 430 and the address decoder 440. The command decoder 473 supplies the generated control signal to the write processor 474.

The write processor 474 controls the driver 430 and the address decoder 440 to write the data in the write position specified by the general write address or the alternative write address. The write processor 474 verifies after the writing of the data in the write position specified by the general write address to determine whether the writing is successful. When the writing of the data is successful, the write processor 474 generates the status notifying that the data is written in the general write address and supplies the same to the memory controller 300.

On the other hand, when the writing of the data is unsuccessful, the write processor 474 generates the alternative write address corresponding to the general write address in which the writing is performed. Then, the write processor 474 controls the driver 430 and the address decoder 440 to write the data in the write position specified by the alternative write address. Then, the write processor 474 verifies to determine whether the writing is successful. When the writing of the data is successful, the write processor 474 generates the status notifying that the data is written in the alternative write address and supplies the same to the memory controller 300. On the other hand, when the writing of the data is unsuccessful, the write processor 474 generates the status notifying that the writing of the data is unsuccessful and supplies the same to the memory controller 300.

[Operation Example of Memory Controller]

Figure 9:
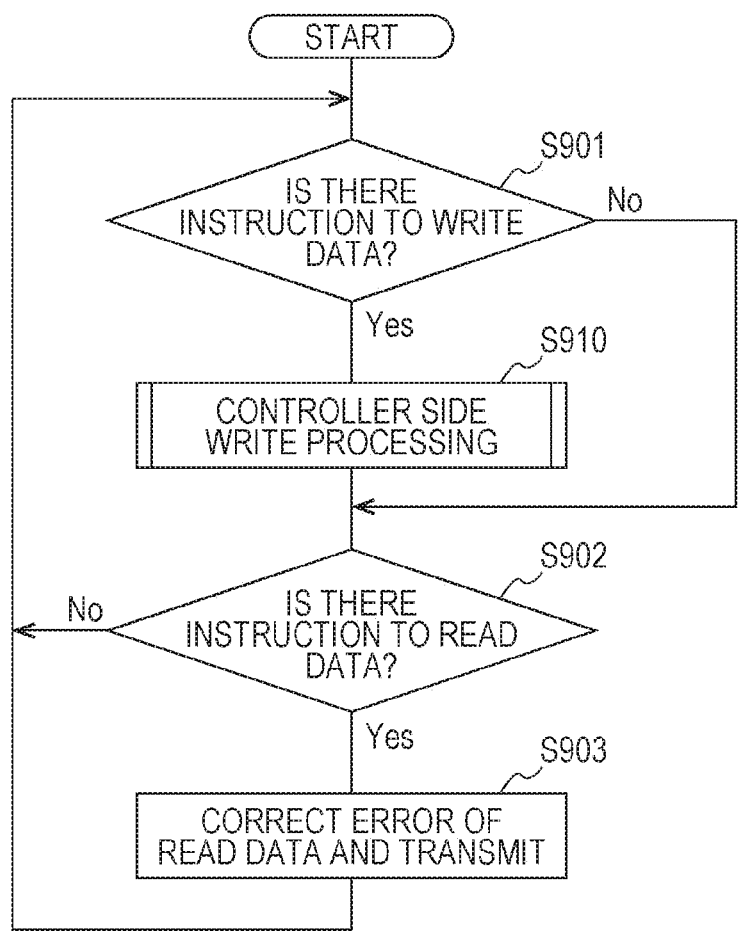
FIG. 9 is a flowchart illustrating an example of operation of the memory controller in the first embodiment.

FIG. 9 is a flowchart illustrating an example of operation of the memory controller in the first embodiment. The operation starts when the storage 200 is powered on, for example.

The memory controller 300 determines whether this is instructed by the host computer 100 to write the data (step S901). When the memory controller 300 is instructed to write the data (step S901: Yes), this executes controller side write processing (step S910). When the memory controller 300 is not instructed to write the data (step S901: No) or after step S910, this determines whether this is instructed by the host computer 100 to read the data (step S902).

When the memory controller 300 is instructed to read the data (step S902: Yes), this performs the error correction of the read data from the non-volatile memory 400 and transmits the read data after the error correction to the host computer 100 (step S903). When the memory controller 300 is not instructed to read the data (step S902: No) or after step S903, this returns to step S901.

Figure 10:
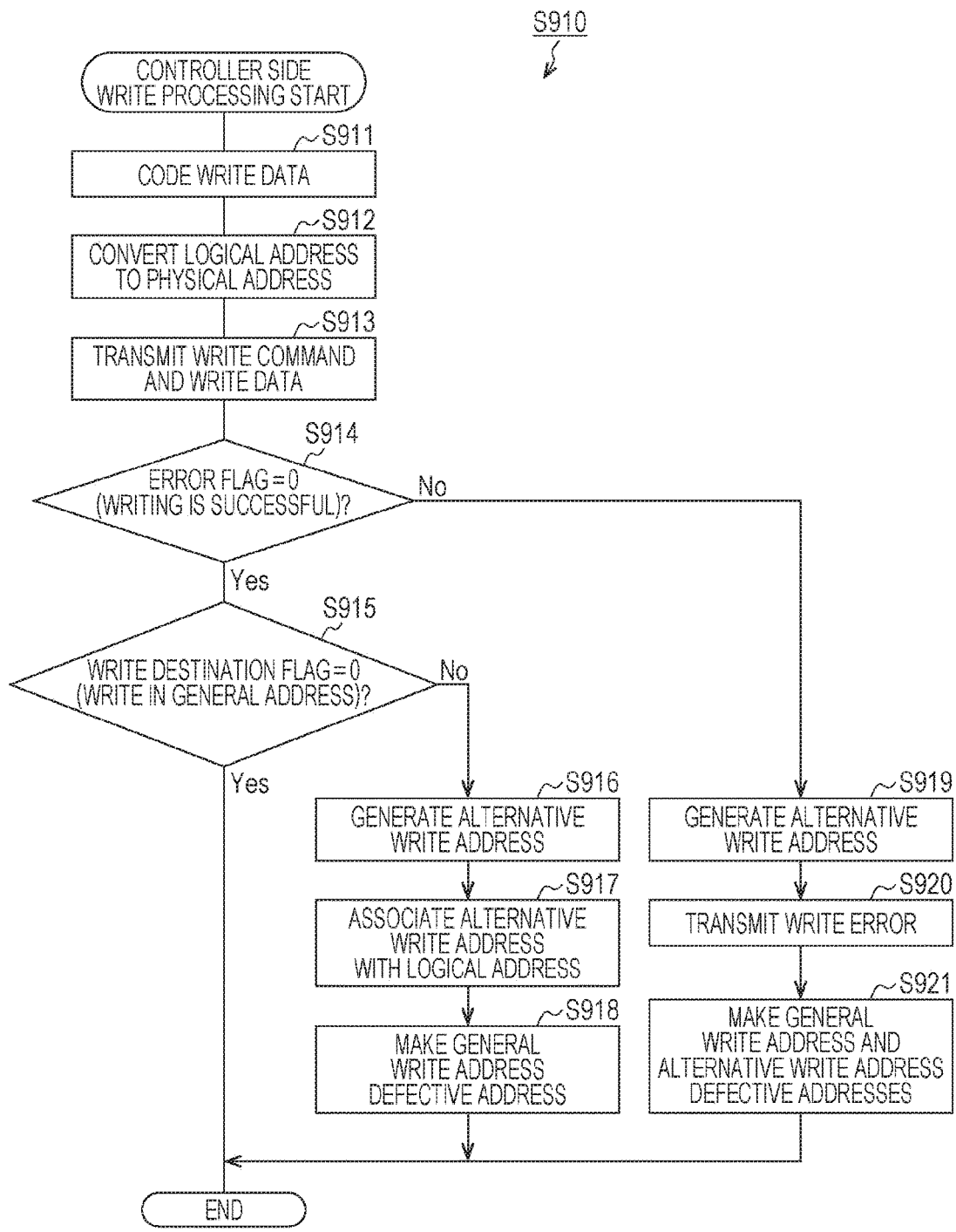
FIG. 10 is a flowchart illustrating an example of controller side write processing in the first embodiment.

FIG. 10 is a flowchart illustrating an example of the controller side write processing in the first embodiment. The memory controller 300 codes the write data (step S911). The memory controller 300 uses the address conversion table 312 to convert the logical address specified by the host computer 100 to the physical address and makes the same the general write address (step S912). Then, the memory controller 300 transmits the write command specifying the general write address and the coded write data to the non-volatile memory 400 (step S913).

Then, the memory controller 300 determines whether the writing of the data is successful with reference to the error flag from the non-volatile memory 400 (step S914). For example, when the error flag is set to "0", it is determined that the writing is successful. When the writing of the data is successful (for example, the error flag is set to "0"), (step S914: Yes), the memory controller 300 determines whether the data is written in the general write address with reference to the write destination flag (step S915). For example, when the write destination flag is set to "0", it is determined that the data is written in the general write address.

When the data is written in the alternative write address (for example, when the write destination flag is set to "1") (step S915: No), the memory controller 300 generates the alternative write address corresponding to the general write address (step S916). Then, the memory controller 300 associates the alternative write address with the specified logical address in the address conversion table 312 (step S917). Also, the memory controller 300 updates the general write address to the "defective" address in the address conversion table 312 (step S918).

Also, when the writing of the data is unsuccessful (step S914: No), the memory controller 300 generates the alternative write address corresponding to the general write address (step S919). Also, the memory controller 300 transmits the write error to the host computer 100 (step S920). Then, the memory controller 300 updates the general write address and the alternative write address to the "defective" addresses in the address conversion table 312 (step S921).

When the data is written in the general write address (step S915: Yes) or after steps S918 and S921, the memory controller 300 finishes the controller side write processing.

[Operation Example of Non-Volatile Memory]

Figure 11:
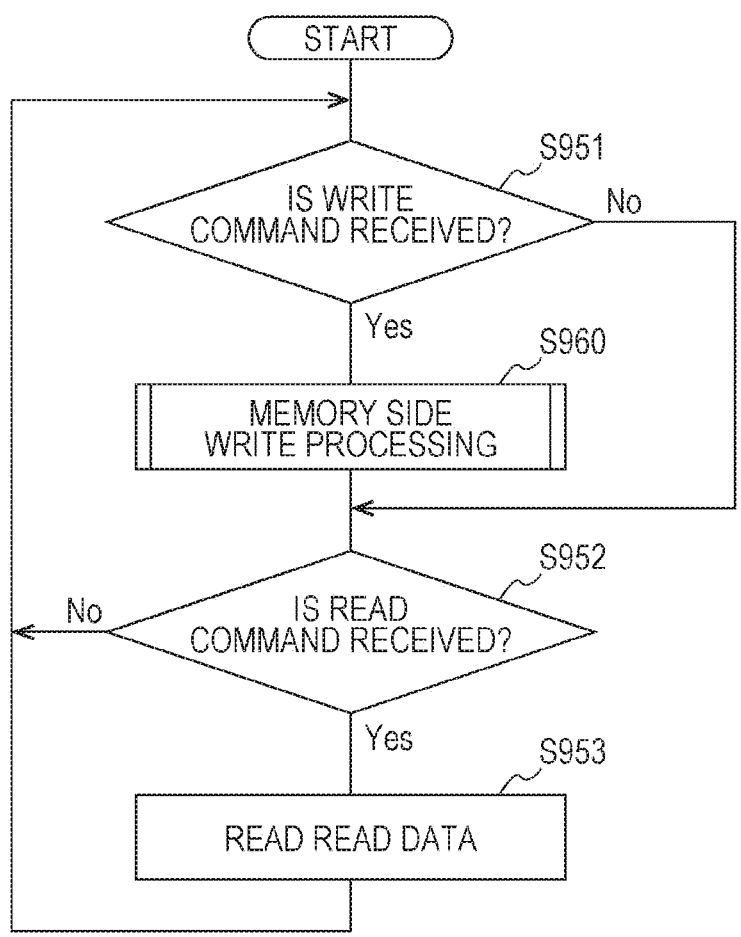
FIG. 11 is a flowchart illustrating an example of operation of the non-volatile memory in the first embodiment.

FIG. 11 is a flowchart illustrating an example of operation of the non-volatile memory 400 in the first embodiment. The operation starts when the storage 200 is powered on, for example.

The non-volatile memory 400 determines whether this receives the write command from the memory controller 300 (step S951). When the non-volatile memory 400 receives the write command (step S951: Yes), this executes memory side write processing (step S960). On the other hand, when the non-volatile memory 400 does not receive the write command (step S951: No) or after step S960, this determines whether this receives the read command from the memory controller 300 (step S952).

When receiving the read command (step S952: Yes), the non-volatile memory 400 reads the read data and transmits the read read data to the memory controller 300 (step S953). When the non-volatile memory 400 does not receive the read command (step S952: No) or after step S953, this returns to step S951.

Figure 12:
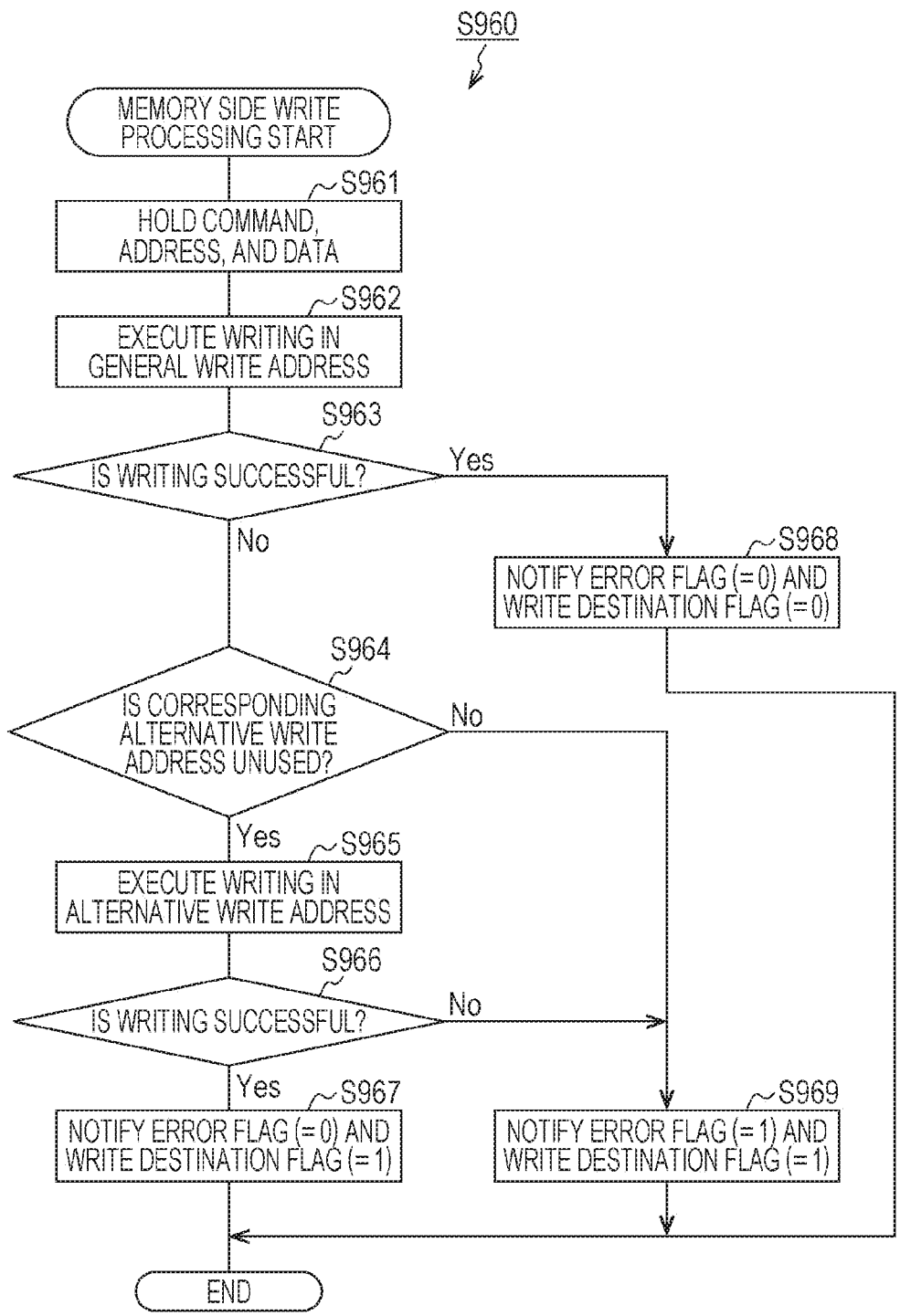
FIG. 12 is a flowchart illustrating an example of memory side write processing in the first embodiment.

FIG. 12 is a flowchart illustrating an example of the memory side write processing in the first embodiment. The non-volatile memory 400 holds the command, the address, and the data (step S961) and writes the data in the general write address (step S962).

Then, the non-volatile memory 400 verifies to determine whether the writing in the write position specified by the general write address is successful from the result thereof (step S963). When the writing of the data is successful (step S963: Yes), the non-volatile memory 400 generates the status notifying that the data is successfully written in the general write address and transmits the same to the memory controller 300. For example, the error flag set to "0" and the write destination flag set to "0" are notified (step S968).

On the other hand, when the writing of the data is unsuccessful (step S963: No), the non-volatile memory 400 generates the alternative write address corresponding to the general write address and determines whether the alternative write address is unused (step S964). When the alternative write address is unused (step S964: Yes), the non-volatile memory 400 writes the data in the write position specified by the alternative write address (step S965). Then, the non-volatile memory 400 verifies to determine whether the data is successfully written in the alternative write address from the result thereof (step S966). When the writing of the data is successful (step S966: Yes), the non-volatile memory 400 generates the status notifying that the data is successfully written in the alternative write address and transmits the same to the memory controller 300. For example, the error flag set to "0" and the write destination flag set to "1" are notified (step S967).

When the alternative write address is already used (step S964: No) or when the writing of the data is unsuccessful (step S966: No), the non-volatile memory 400 generates the status notifying the write error and transmits the same to the memory controller 300. For example, the error flag set to "1" and the write destination flag set to "1" are notified (step S969). After step S967, S968, or S969, the non-volatile memory 400 finishes the memory side write processing.

In this manner, according to the first embodiment of the present technology, the non-volatile memory 400 generates the alternative write address when the writing of the data in the general write address is unsuccessful, so that it is not required to transmit the write error and receive the alternative write address when the writing is unsuccessful. According to this, the data writing time may be shortened by delay time required for transmitting the write error and receiving the alternative write address. Therefore, the non-volatile memory 400 may write the data at a high speed.

[Variation]

Although the non-volatile memory 400 does not transmit the generated alternative write address in the first embodiment, this may also be configured to transmit the alternative write address. A memory system in a variation is different from that in the first embodiment in that the non-volatile memory 400 transmits the alternative write address.

FIG. 13 is a view illustrating an example of a status in the variation of the first embodiment. In the drawing, a is a view illustrating an example of the status notified when data is written in the alternative write address. In this case, the non-volatile memory 400 generates the status including an error flag and the alternative write address in which the writing is performed and notifies a memory controller 300 of the same. In the drawing, b is a view illustrating an example of the status notified when the data is successfully written in a general write address, in other words, the data is not written in the alternative write address. In this case, the non-volatile memory 400 generates the status including the error flag and notifies the memory controller 300 of the same.

Meanwhile, although the non-volatile memory 400 in the variation does not notify a write destination flag, this may further notify the write destination flag. In this case, for example, when the data is written in the alternative write address, the error flag, the write destination flag, and the alternative write address are notified, and otherwise, the error flag and the write destination flag are notified.

Figure 14:
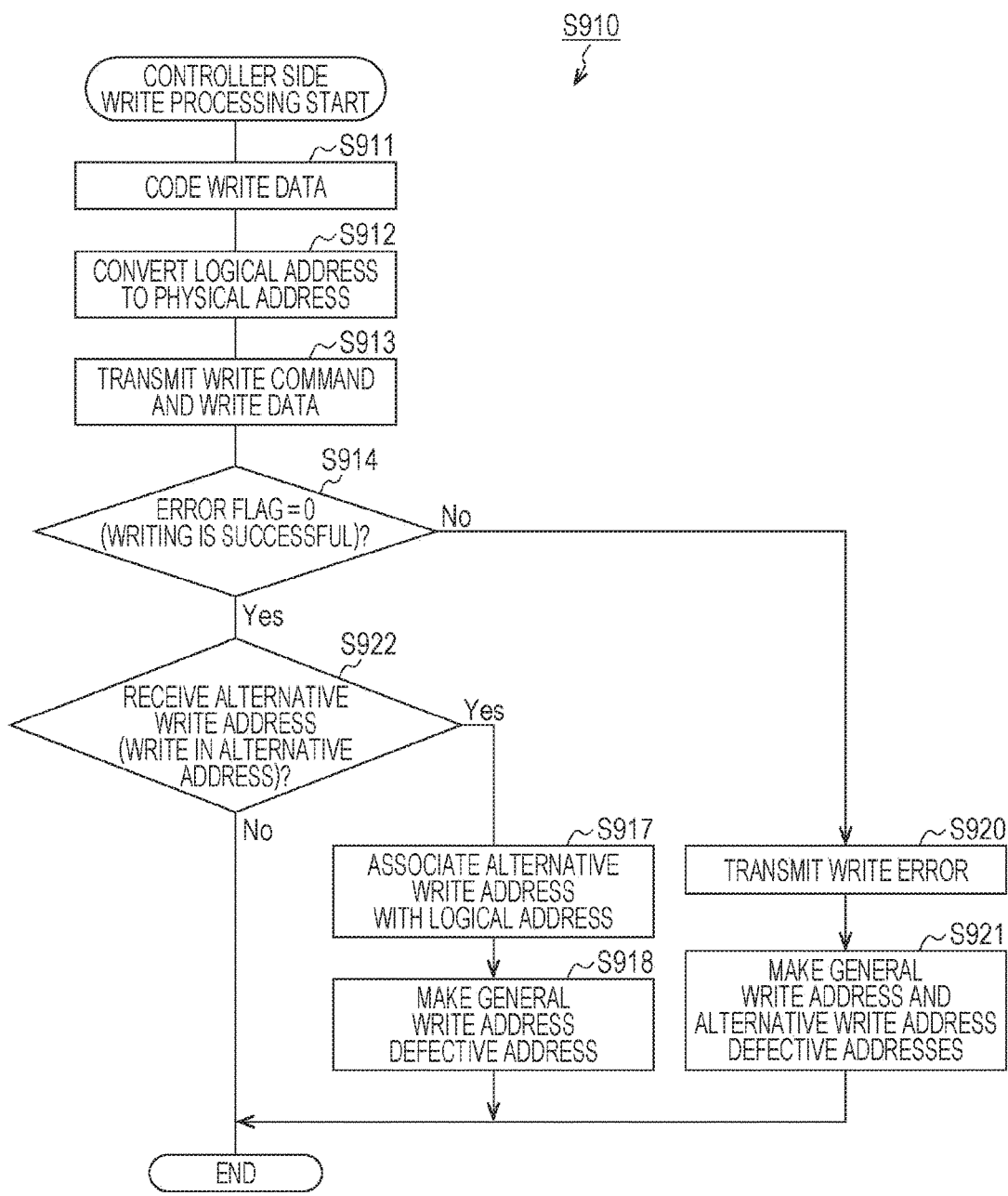
FIG. 14 is a flowchart illustrating an example of controller side write processing in the variation of the first embodiment.

FIG. 14 is a flowchart illustrating an example of controller side write processing in the variation of the first embodiment. The controller side write processing in the variation is different from that in the first embodiment in that steps S916 and S919 are not executed and step S922 is executed in place of step S915.

When the writing of the data is successful (for example, the error flag is "0") (step S914: Yes), the memory controller 300 determines whether this receives the alternative write address (step S922).

When receiving the alternative write address (step S922: Yes), the memory controller 300 associates the alternative write address with a logical address specified by a host computer 100 in an address conversion table 312 (step S917).

Also, when the writing of the data is unsuccessful (step S914: No), the memory controller 300 transmits a write error to the host computer 100 (step S920). Also, when the memory controller 300 does not receive the alternative write address (step S922: No), this finishes the controller side write processing after step S918 or S921.

Figure 15:
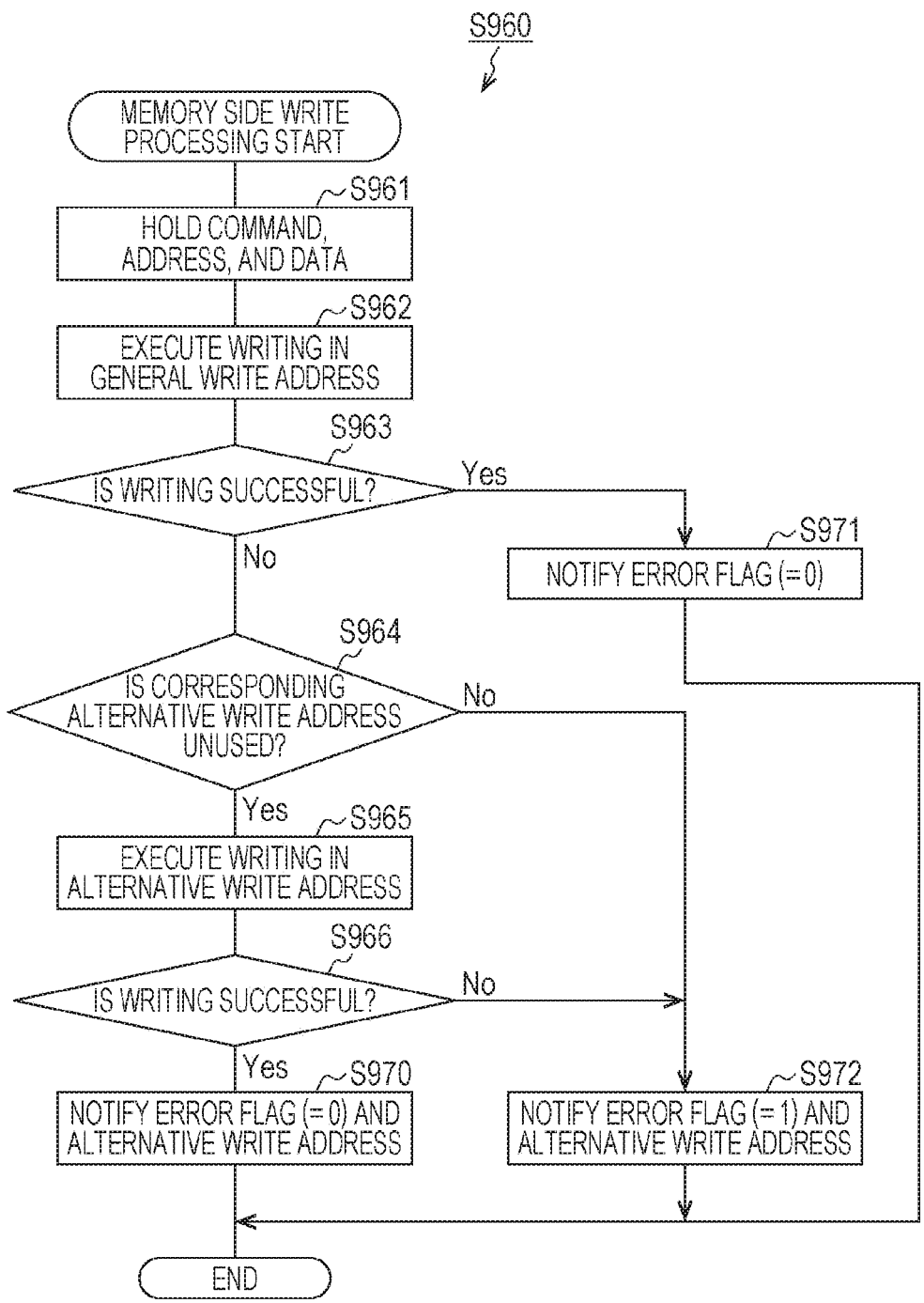
FIG. 15 is a flowchart illustrating an example of memory side write processing in the variation of the first embodiment.

FIG. 15 is a flowchart illustrating an example of memory side write processing in the first variation of the first embodiment. The memory side write processing in the first variation is different from that in the first embodiment in that steps S970, S971, and S972 are executed in place of steps S967, S968, and S969, respectively.

When the data is successfully written in the general write address (step S963: Yes), the non-volatile memory 400 generates the status notifying that the data is successfully written in the general write address and transmits the same to the memory controller 300. For example, the error flag set to "0" is notified (step S971).

Alternatively, when the data is successfully written in the alternative write address (step S966: Yes), the non-volatile memory 400 generates the status notifying that the data is successfully written in the alternative write address and transmits the same to the memory controller 300. For example, the error flag set to "0" and the alternative write address are notified (step S970).

When the alternative write address is already used (step S964: No) or when the writing of the data is unsuccessful (step S966: No), the non-volatile memory 400 notifies the error flag set to "1" and the alternative write address (step S972).

In this manner, according to the first variation, the non-volatile memory 400 transmits the generated alternative write address to the memory controller 300, so that the memory controller 300 is not required to generate the alternative write address.

2. Second Embodiment

Although the correspondence relationship between the general write address and the alternative write address is fixed and the non-volatile memory 400 writes the data in the corresponding alternative write address in the first embodiment. However, when the correspondence relationship is fixed, when the corresponding alternative write address is already used, even if the alternative write address which does not correspond is unused, the non-volatile memory 400 cannot write in this alternative write address. Therefore, the non-volatile memory 400 cannot efficiently use the alternative data area 422. If it is configured such that the correspondence relationship is not fixed and the non-volatile memory 400 selects any unused alternative write address to write, it is possible to repeatedly rewrite until there is no more unused alternative write address. The non-volatile memory 400 in the second embodiment is different from that in the first embodiment in that this selects any unused alternative write addresses to write the data.

Figure 16:
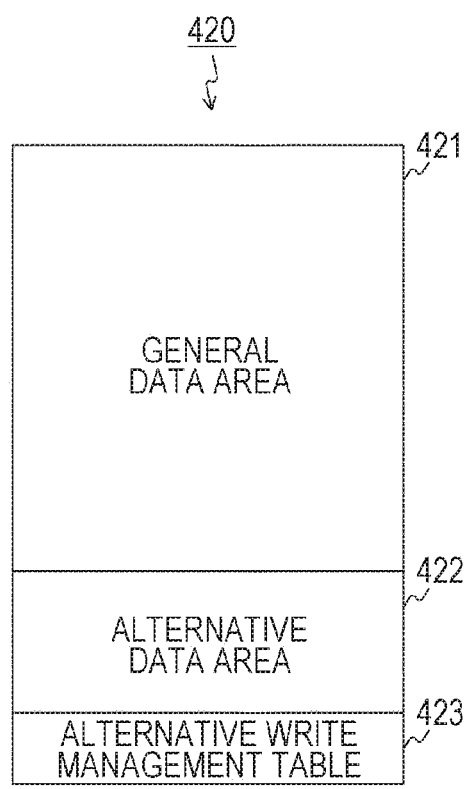
FIG. 16 is a view illustrating a configuration example of a memory cell array in a second embodiment.

FIG. 16 is a view illustrating a configuration example of a memory cell array 420 in the second embodiment. The memory cell array 420 of the second embodiment is further provided with an alternative write management table 423 in addition to a general data area 421 and the alternative data area 422. The alternative write management table 423 is the table which holds a use flag for each alternative write address. The use flag is not stored in the alternative data area 422 of the second embodiment and only the data is stored for each alternative write address.

Figure 17:
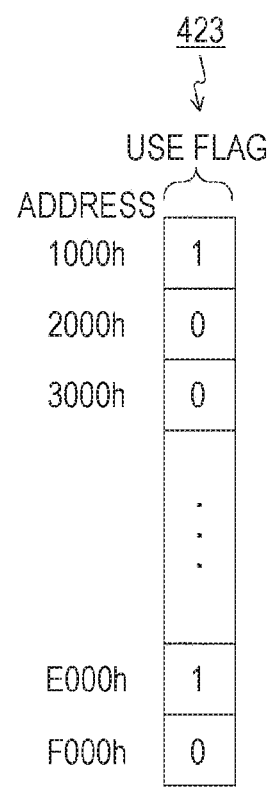
FIG. 17 is a view illustrating an example of an alternative write management table in the second embodiment.

FIG. 17 is a view illustrating an example of the alternative write management table 423 in the second embodiment. The alternative write management table 423 holds the use flag for each alternative write address. Meanwhile, a memory cell which holds the alternative write management table 423 is an example of a holding unit recited in claims.

Herein, when there is a plurality of use flags, the use flags are desirably collectively stored in the same address. For example, when 16 fuse lags are held, 16-bit data including the 16 use flags is stored in one address. When the number of use flags is large such that they cannot be stored in one address, they are stored in a plurality of addresses in a divided manner. For example, when 32 use flags are held, 32-bit data including the 32 use flags is divided in two to be stored in two addresses.

Figure 18:
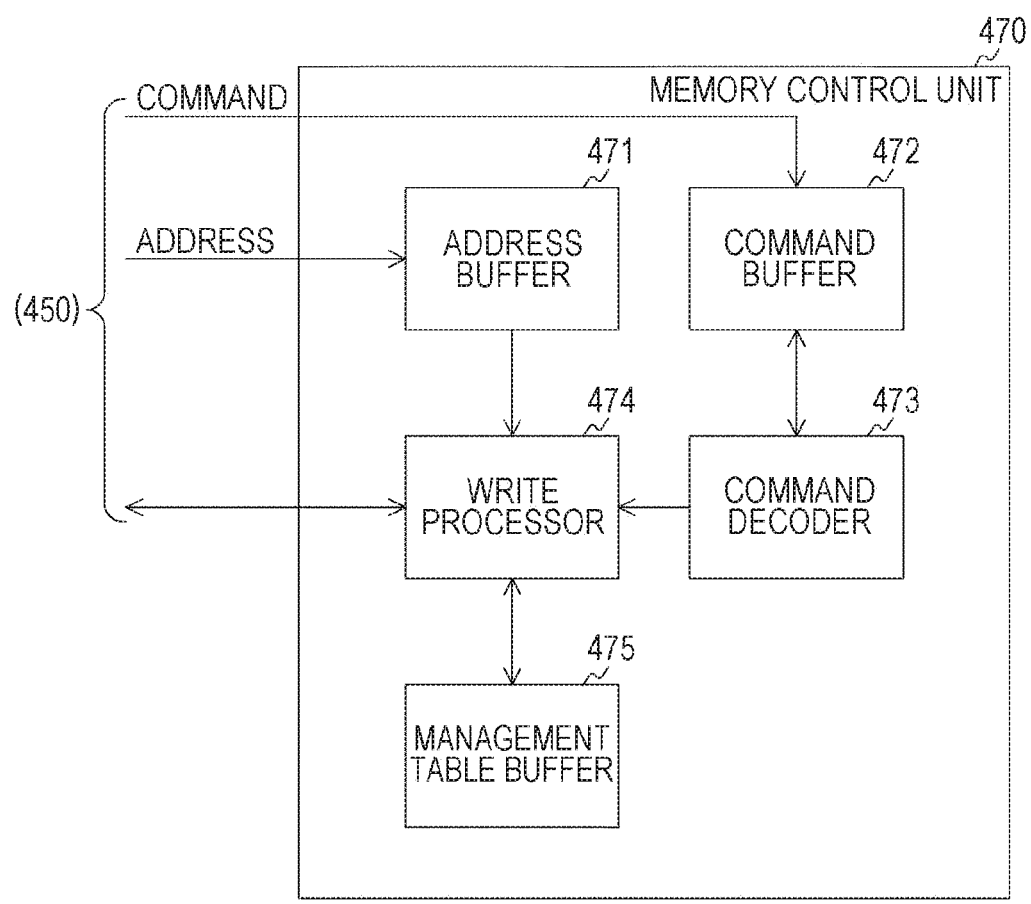
FIG. 18 is a block diagram illustrating a configuration example of a memory control unit in the second embodiment.

FIG. 18 is a block diagram illustrating a configuration example of a memory control unit 470 in the second embodiment. The memory control unit 470 of the second embodiment is different from that of the first embodiment in further holding a management table buffer 475.

The management table buffer 475 holds the use flag for each alternative write address. When the writing in the general write address is unsuccessful, a write processor 474 of the second embodiment reads the use flag of each alternative write address from the alternative write management table 423 and allows the management table buffer 475 to hold the same.

Then, the write processor 474 refers to the use flag held in the management table buffer 475, and when where is one or more unused alternative write addresses, rewrites the data in any of the alternative write addresses. When this fails in writing in the alternative write address, this refers to the use flag again and repeatedly rewrites as long as there is the unused alternative write address.

Also, when the writing in the general write address is successful, the write processor 474 notifies a memory controller 300 that the writing of the data is successful. Also, when the writing in the alternative write address is successful, the write processor 474 notifies the memory controller 300 of the fact that the writing of the data is successful and the alternative write address. When the writing in the general write address and the alternative write address is unsuccessful, the write processor 474 notifies the memory controller 300 of the fact that the writing of the data is unsuccessful and the alternative write address.

Figure 19:
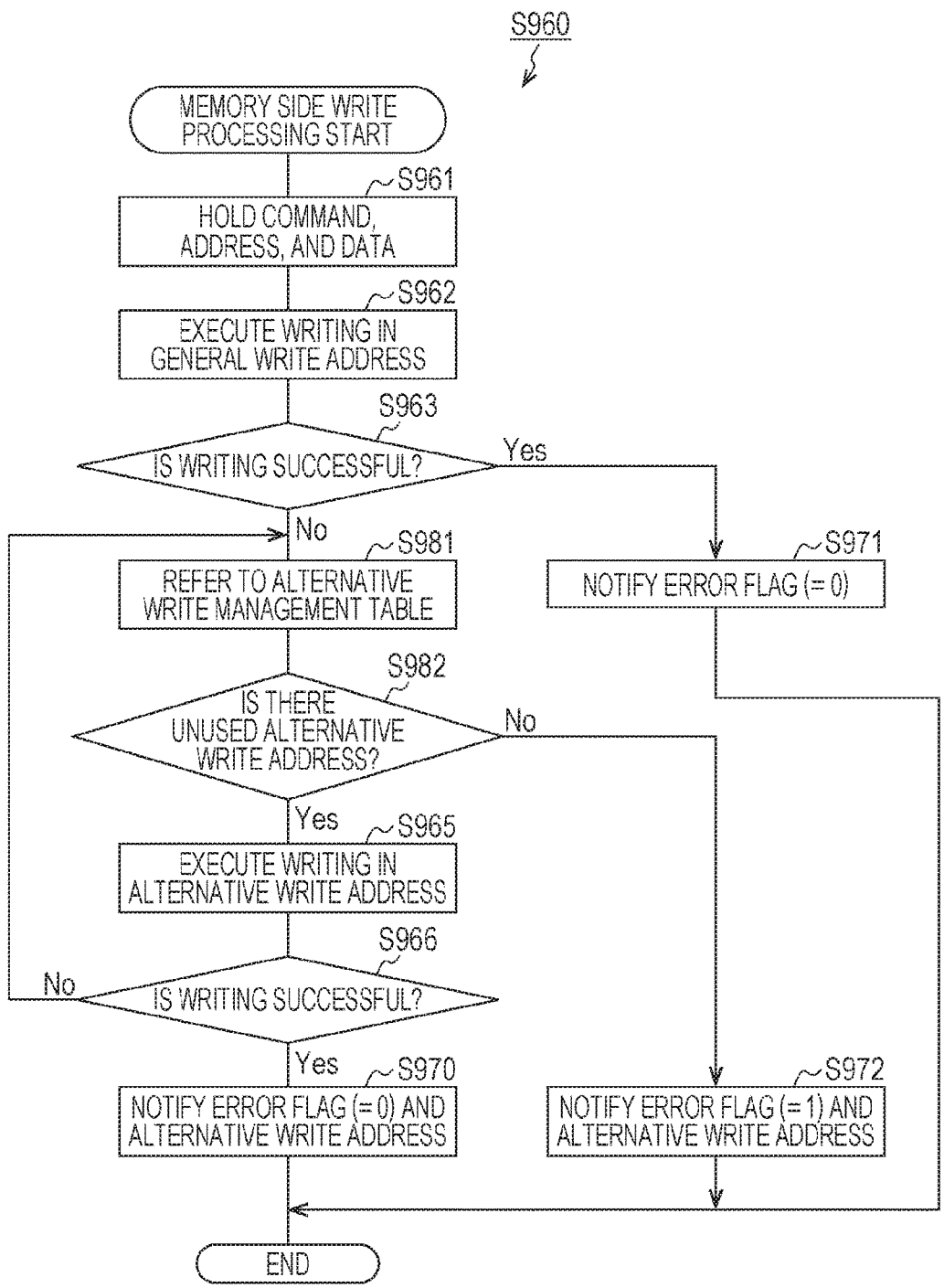
FIG. 19 is a flowchart illustrating an example of memory side write processing in the second embodiment.

FIG. 19 is a flowchart illustrating an example of memory side write processing in the second embodiment. The memory side write processing of the second variation is different from that of the variation of the first embodiment in that steps S981 and S982 are executed in place of step S964.

When the writing of the data in the general write address is unsuccessful (step S963: No), the non-volatile memory 400 refers to the alternative write management table 423 (step S981) to determine whether there is the unused alternative write address (step S982).

When there is no unused alternative write address (step S982: No), the non-volatile memory 400 executes step S972. On the other hand, when there is the unused alternative write address (step S982: Yes), the non-volatile memory 400 selects any alternative address and writes the data in the address (step S965).

Then, the non-volatile memory 400 determines whether the data is successfully written in the alternative write address (step S966). When the data is successfully written in the alternative write address (step S966: Yes), the non-volatile memory 400 executes step S970, and if not (step S966: No), this returns to step S981.

Meanwhile, controller side write processing of the second variation is similar to the controller side write processing of the variation illustrated in FIG. 14.

In this manner, according to the second embodiment, the non-volatile memory 400 holds the use flag for each alternative write address and rewrites if there is the unused alternative write address, so that this may repeatedly rewrite until there is no more unused alternative write address. Therefore, the non-volatile memory 400 may efficiently use the alternative data area.

Meanwhile, the above-described embodiments describe an example of embodying the present technology, and there is a correspondence relationship between matters in the embodiments and the matters specifying the invention in claims. Similarly, there is the correspondence relationship between the matters specifying the invention in claims and the matters in the embodiments of the present technology having the same name. However, the present technology is not limited to the embodiments and may be embodied by variously modifying the embodiments without departing from the scope thereof.

The procedure described in the above-described embodiments may also be considered as a method having a series of procedures and may also be considered as a program for allowing a computer to execute the series of procedures or a recording medium which stores the program. A compact disc (CD), a MiniDisc (MD), a digital versatile disc (DVD), a memory card, a Blu-Ray™ Disc and the like may be used, for example, as the recording medium.

Meanwhile, the effect is not necessarily limited to that herein described and may be any effect described in this disclosure.

Meanwhile, the present technology may also have the following configuration.

(1) A storage device including:
a data area in which a write position is specified by a write address; and
a control unit which writes data in the write position when the write position is specified by the write address and generates a write address different from the specified write address as an alternative write address to write the data in a write position specified by the alternative write address when writing of the data is unsuccessful.

(2) The storage device according to (1) described above, wherein the data area includes
a general data area in which the write position is specified by a general write address being the write address specified by a write command, and
an alternative data area in which the write position is specified by the alternative write address corresponding to the general write address, and
the control unit generates the alternative write address corresponding to the general write address when the writing of the data is unsuccessful.

(3) The storage device according to (1) described above, further including:
a holding unit which holds a use flag indicating whether the data is written in the alternative write address for each alternative write address,
wherein the control unit generates the alternative write address relating to the use flag indicating that the writing is not performed when the writing of the data is unsuccessful.

(4) A storage system including:
a control device which specifies a write position of data by a write address;
a data area in which the write position is specified by the write address; and
a control unit which writes the data in the write position when the write position is specified by the write address and generates a write address different from the specified write address as an alternative write address to write the data in a write position specified by the alternative write address when writing of the data is unsuccessful.

(5) The storage system according to (4) described above, wherein the control device includes
an address conversion table which associates a logical address and a physical address with each other to hold, and
an access control unit which obtains the physical address corresponding to the logical address as the write address to specify the write position by the write address, and associates the alternative write address with the logical address when the writing of the data in the write position specified by the alternative write address is successful.

(6) The storage system according to (5) described above, wherein the data area includes
a general data area in which the write position is specified by a general write address being the write address specified by a write command, and
an alternative data area in which the write position is specified by the alternative write address corresponding to the general write address, and
the control unit generates the alternative write address corresponding to the general write address in which the writing is performed when the writing of the data is unsuccessful.

(7) The storage system according to (6) described above, wherein the control unit supplies an error flag and a write destination flag to the access control unit, the error flag indicating whether the writing of the data is successful, the write destination flag indicating which of the general write address and the alternative write address is specified when the data is written, and
the access control unit generates the alternative write address corresponding to the general write address to associate with the logical address when being supplied with the error flag indicating that the writing of the data is successful and the write destination flag indicating that the data is written with the alternative write address specified.

(8) The storage system according to (5) or (6) described above,
wherein the control unit supplies an error flag indicating whether the writing of the data is successful and the generated alternative write address to the access control unit, and
the access control unit associates the supplied alternative write address with the logical address when being supplied with the error flag indicating that the writing of the data is successful and the alternative write address.

(9) A method of controlling a storage device including:
a writing step of writing data in a write position when the write position is specified by a write address; and
a rewriting step of generating a write address different from the specified write address as an alternative write address and writing the data in a write position specified by the alternative write address when the writing of the data is unsuccessful.

REFERENCE SIGNS LIST

100 Host computer
200 Storage
300 Memory controller
301 Host interface
302 RAM
303 CPU
304 ECC processor
305 ROM
306, 450 Bus
307 Memory interface
311 Access control unit
312 Address conversion table
400 Non-volatile memory
410 Data buffer
420 Memory cell array
421 General data area
422 Alternative data area
423 Alternative write management table
430 Driver
440 Address decoder
460 Control interface
470 Memory control unit
471 Address buffer 472 Command buffer
473 Command decoder
474 Write processor
475 Management table buffer

The invention claimed is:

1. A storage device, comprising:
a data area that comprises a first write position, wherein the first write position is specified based on a write address; and
a control unit configured to:
write data in the first write position based on the first write position that is specified by the write address,
update a write destination flag, wherein the updated write destination flag indicates whether the write address is at least one of a general write address or an alternative write address,
generate the alternative write address based on the updated write destination flag that indicates that the write address is the alternative write address, wherein the alternative write address is different from the general write address, and
write the data in a second write position specified by the alternative write address based on a data writing operation that is unsuccessful.

2. The storage device according to claim 1, wherein the data area further includes:
a general data area in which the first write position is specified by the general write address, wherein the general write address is the write address specified by a write command, and
an alternative data area in which the second write position is specified by the alternative write address corresponding to the general write address, and
the control unit is further configured to generate the alternative write address corresponding to the general write address based on the data writing operation is unsuccessful.

3. The storage device according to claim 1, further comprising:
a holding unit configured to hold a use flag for the alternative write address, wherein the use flag indicates whether the data is written in the alternative write address, and
wherein the control unit is further configured to generate the alternative write address related to the use flag to indicate that the data writing operation is unsuccessful.

4. A storage system, comprising:
a control device configured to specify a first write position of data by a write address;
a data area that comprises the first write position, wherein the first write position is specified based on the write address; and
a control unit configured to:
write the data in the first write position based on the first write position that is specified by the write address,
update a write destination flag, wherein the updated write destination flag indicates whether the write address is at least one of a general write address or an alternative write address,
generate the alternative write address based on the updated write destination flag that indicates that the write address is the alternative write address, wherein the alternative write address is different from the general write address, and
write the data in a second write position specified by the alternative write address based on a data writing operation that is unsuccessful.

5. The storage system according to claim 4, wherein the control device further includes:
an address conversion table which associates a logical address and a physical address, and
an access control unit obtains the physical address corresponding to the logical address as the general write address to specify the first write position by the write address, and associate the alternative write address with the logical address based on the data writing operation, of the data in the second write position specified by the alternative write address, that is successful.

6. The storage system according to claim 5, wherein the data area includes:
a general data area in which the first write position is specified by the general write address, wherein the general write address is the write address specified by a write command, and
an alternative data area in which the second write position is specified by the alternative write address corresponding to the general write address, and
the control unit is further configured to generate the alternative write address corresponding to the general write address based on the data writing operation that is unsuccessful.

7. The storage system according to claim 6,
wherein the control unit is further configured to supply an error flag and the write destination flag to the access control unit, wherein the error flag indicates whether the data writing operation is successful, and
the access control unit is further configured to generate the alternative write address corresponding to the general write address, wherein the alternative write address is associated with the logical address based on the error flag that indicates the data writing operation is successful, and wherein the write destination flag indicates that the data is written in the alternative write address.

8. The storage system according to claim 5, wherein the control unit is further configured to supply an error flag that indicates whether the writing of the data is successful and the alternative write address to the access control unit, and
the access control unit is further configured to associate the supplied alternative write address with the logical address based on the alternative write address that is supplied with the error flag, wherein the error flag indicates that the data writing operation is successful.

9. A method, comprising:
writing of data in a first write position, wherein the first write position is specified by a write address;
updating a write destination flag, wherein the updated write destination flag indicates whether the write address is at least one of a general write address or an alternative write address;
generating the alternative write address based on the updated write destination flag that indicates that the write address is the alternative write address, wherein the alternative write address is different from the general write address; and
writing the data in a second write position specified by the alternative write address based on a data writing operation of the data that is unsuccessful.

* * * * *